Figure 1:
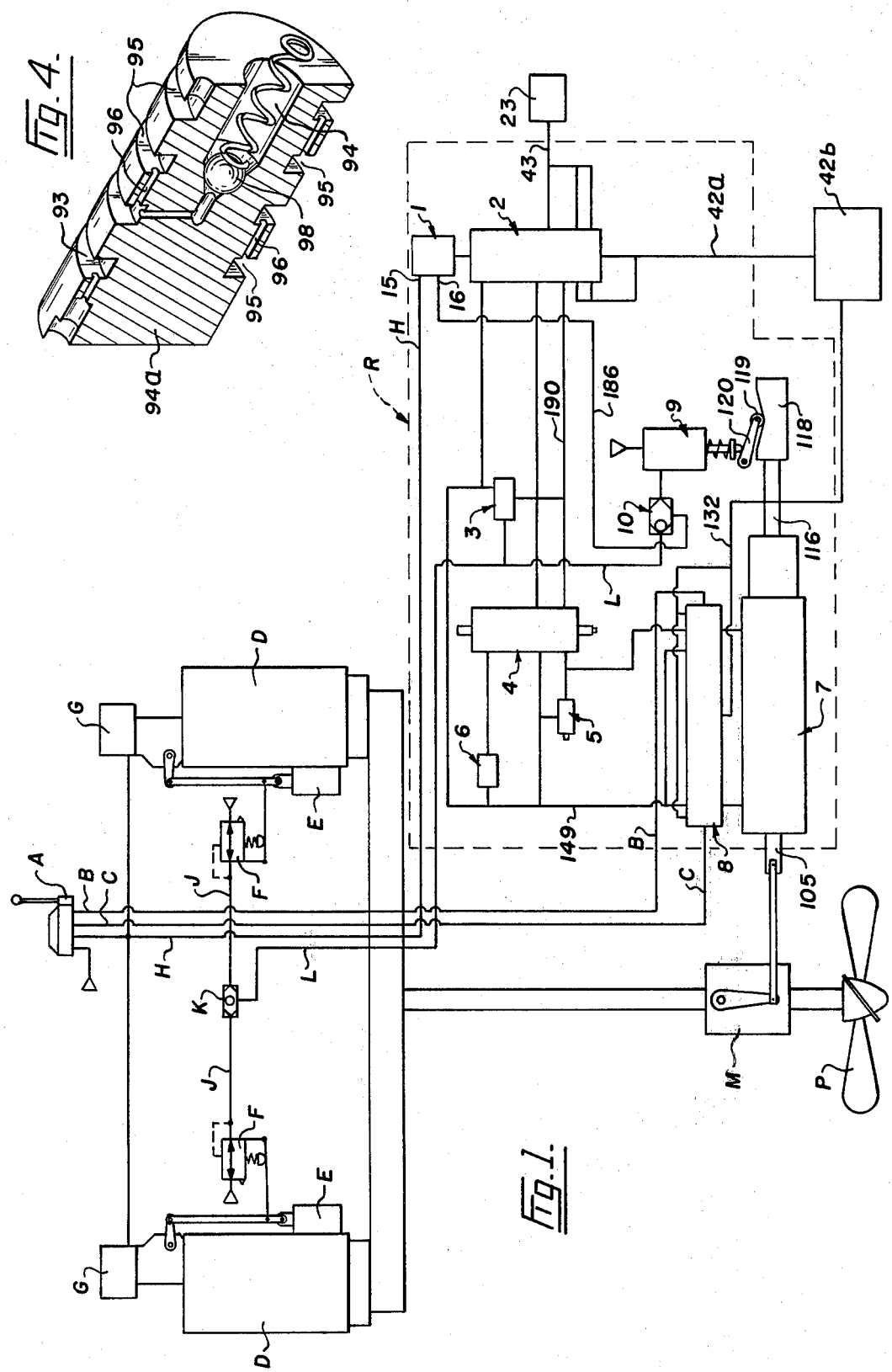

United States Patent [19]
Bjorknas

[11] 3,915,590
[45] Oct. 28, 1975

[54] PROPELLER PITCH CONTROL APPARATUS

[75] Inventor: John I. Bjorknas, North Vancouver, Canada

[73] Assignee: Prime Mover Controls Ltd., Vancouver, Canada

[22] Filed: Aug. 12, 1974

[21] Appl. No.: 496,823

[52] U.S. Cl. .................................................. 416/43
[51] Int. Cl.² ........................................... B63H 3/10
[58] Field of Search ................................. 416/31, 43

[56] References Cited
UNITED STATES PATENTS

| | | | |
|---|---|---|---|
| 2,801,701 | 8/1957 | Coar | 416/43 |
| 3,253,658 | 5/1966 | Bradley | 416/43 |
| 3,527,186 | 9/1970 | Wennberg et al. | 416/157 UX |
| 3,603,697 | 9/1971 | Lane | 416/43 X |
| 3,826,590 | 7/1974 | Kobelt | 416/43 X |

*Primary Examiner*—Everette A. Powell, Jr.
*Attorney, Agent, or Firm*—Fetherstonhaugh & Co.

[57] ABSTRACT

Apparatus including a piston and cylinder power assembly for increasing and decreasing the pitch of a propeller driven by an engine having a manual controller and an automatic load controller, a pitch selector assembly associated with the power assembly to effect pitch increase and decrease in accordance with air signals from the manual controller, first and second fluid networks having a bypass therebetween, a pilot valve assembly for connecting the networks selectively to a source of pressure fluid or a sump, an operator for operating the pilot valve assembly and responding to air signals from the manual controller to connect the pressure fed source to the networks, a load control valve in the bypass operable by air signals from the load controller to close said bypass, a fluid flow resistance assembly in the second network, a pressure transmitter operable to connect a source of air pressure to the pressure operator to oppose any air signal from the manual controller to cause the pilot valve assembly to cut off the pressure source from the networks, and valve means operable by an air signal from the load controller to cut off the pressure transmitter from the pressure operator and to direct said signal air to the latter to cause the pilot valve assembly to connect the networks to sump.

27 Claims, 4 Drawing Figures

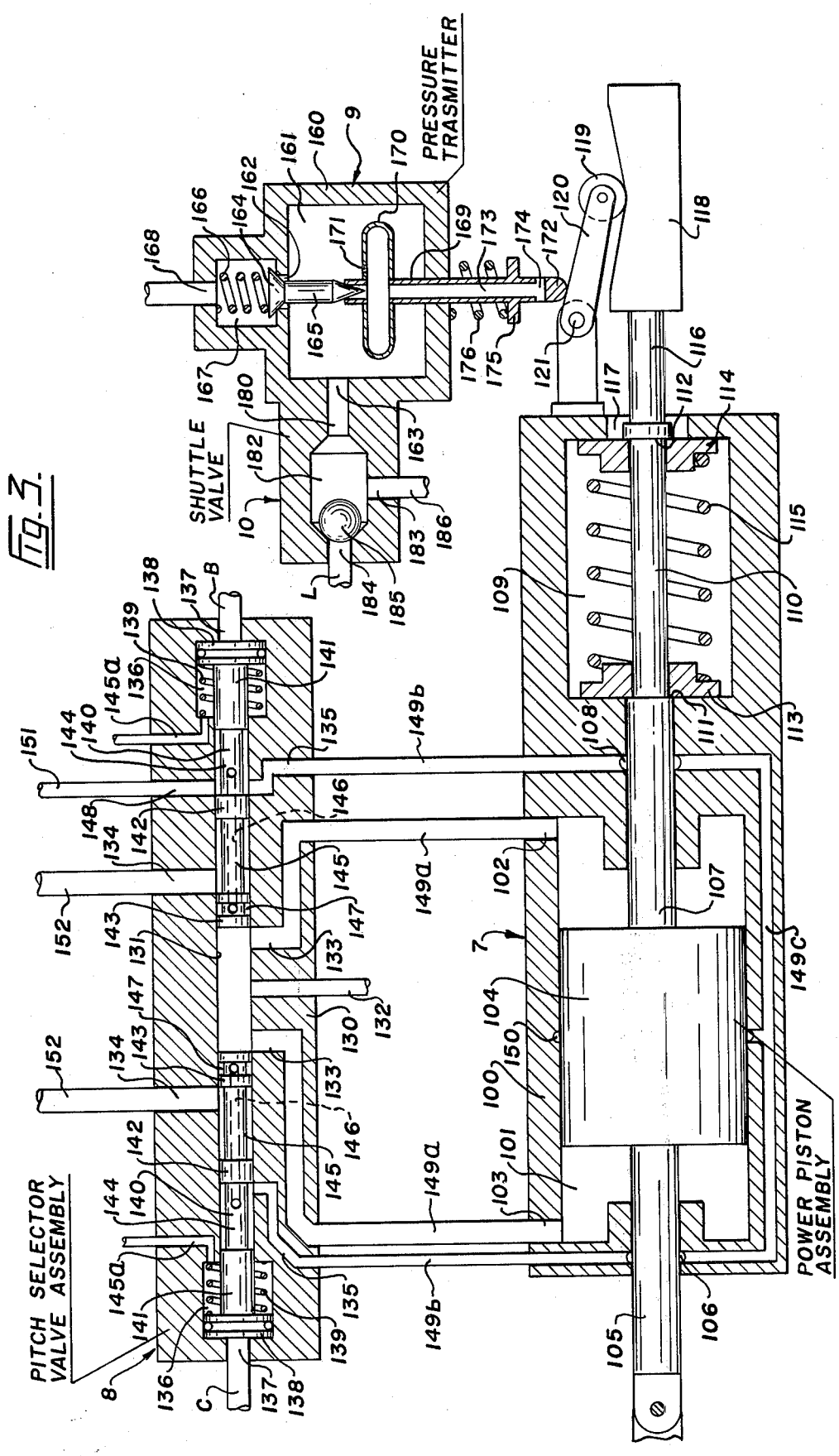

PROPELLER PITCH CONTROL APPARATUS

This invention relates to apparatus for controlling the pitch of the propeller of a vessel in either ahead or astern movement, while protecting the vessel engine or engines from overload due to changes in environment, changing conditions of the load in the vessel, or sudden changes of direction of movement.

Many vessels, such as ferry boats, tow boats, and the like, have variable pitch propellers by means of which the direction of movement of the vessel, its speed, and its load conditions are varied. There are, two conditions that have to be considered, and these are the desired conditions of the vessel and the load to which its power unit is subjected.

There are pitch and load mechanisms in existence which are intended to provide the necessary control. These, however, are not too successful. The mechanisms are not very sensitive and do not respond as quickly as is desirable to change of pitch signal or change of load signal so as to operate within the power/fuel curve of the engine.

It is desirable to be able to use a control at each of one or more stations which provides remote control of engine speed setting, reversal of propeller pitch, and manual control of propeller pitch over a certain power range. This latter is called "inching". It is also desirable to have a load control system that acts upon the propeller pitch setting mechanism to produce a prescribed engine load for each engine speed setting. When the load applied to the engine becomes excessive, it is necessary to quickly impose on the inching control operation an overriding control which takes account of the operating conditions of the engine. Systems which impose load control in this manner are known, but only in arrangements where there is an operational overlap so that both inching and load control occur simultaneously for a short period. This effectively delays the imposition of load control, during which delay overload of the engine occurs.

The pitch control apparatus of the present invention provides an arrangement whereby there is an instanteous transfer from inching to load control without any overlap. The external load controller of the engine sends a continuous power comparison signal which is capable of immediate overriding of inching control when the power requirements are beyond a predetermined speed/power curve of the engine. Another advantage of the present apparatus is that when zero pitch is called for, an accurate setting is attained each time regardless of pneumatic or hydraulic pressure fluctuation because the pneumatic and hydraulic systems are cut off and a mechanical stop employed so that the zero pitch is always attained. The apparatus provides fast and yet stable control, and the pitch controller includes a dampening arrangement operative mainly during automatic load control. Very sensitive and accurate inching and power controls are provided, and the apparatus can easily be adapted to compound driven propellers.

Another advantage of the present invention is that hydraulic fluid is used in the actual control apparatus where the interconnecting lines are short, and pneumatic fluid is used for the control signalling which usually has relatively long lines.

When it is desired to move either ahead or astern, a signal is directed to either the ahead or astern port of a control valve of a power piston to cause said position to move under the action of hydraulic pressure to set the propeller pitch for the appropriate action. The instant this is done, a signal is sent to cut off the oil pressure so as to prevent overshooting of the desired setting. This results in a pitch setting which is very sensitive and instant, acting anywhere from minute movements to relatively large changes. If the speed of the vessel is increased beyond a predeter-determined point, thereby increasing the load on the engine, or if the engine load is unduly increased from any other cause, a signal stops the movement of the power position, thereby stopping any increase in the propeller pitch. In the event of the engine being overloaded beyond a predetermined point, the overload detecting system of the engine sends a signal to relieve the pressure on the power pistion so as to allow the pitch to decrease. There is an immediate counteracting pressure applied to prevent overshooting of the pitch in the decrease direction.

A system according to this invention for controlling the pitch of a variable pitch propeller of a vessel and driven by an engine having a manual controller for normal operating conditions and an automatic load controller for protecting the engine from predetermined overload conditions comprises a first fluid network, a second fluid network in parallel with the first network, pitch operating means to increase and decrease the pitch of said propeller in ahead and astern directions, said operating means being connected to one end of both of said networks and being operable by pressure fluid therefrom, a pitch selector operable by air signals from said manual controller to direct fluid from said networks to the pitch operating means selectively to effect pitch increase or decrease, control means for connecting an opposite end of both of said networks selectively to a source of pressure fluid or a sump, operator means for operating said control means in response to air signals from said manual controller to cause said control means to connect the pressure fluid source to the networks, a bypass between the two networks and having a load control valve therein operably by air signals from said load controller to close the bypass, fluid flow resistance means in the second network between said bypass and said pitch operating means, pressure means connected to a source of pressure air and operable to direct pressure air to said operating means to oppose any signal from the manual controller and thereby to cause said control means to cut off said fluid pressure source from the networks, and valve means operable by a pressure air signal from said load controller to cut off said pressure means from the operator means and to direct said signal air to said operator means to cause said control means to connect said opposite end of the networks to sump.

More specifically, a system in accordance with the present invention for controlling the pitch of a variable pitch propeller of a vessel and driven by an engine having a manaual controller for normal operating conditions and an automatic load controller for protecting the engine from predetermined overload conditions comprises a pistion and cylinder power assembly to increase and decrease the pitch of said propeller in ahead and astern directions, a first fluid network, a second fluid network in parallel with the first network, an ahead and astern pitch selector valve assembly for connecting one end of both of said networks selectively to the power assembly to effect pitch increase or decrease in accordance with signals from said manual controller, a pilot valve assembly for connecting an opposite end of both of said networks selectively to a source of pressure fluid or a sump, an air pressure operator for operating said pilot valve assembly, said pressure operator responding to signals from said manual controller to cause the pilot valve assembly to connect said pressure fluid source to said networks, a bypass between the two networks and having a normally open air-controlled load control valve therein, said control valve being operable by signals from said load controller to close said bypass, a fluid flow resistance assembly in the second network between said bypass and the power assembly, a pressure transmitter connected to a source of pressure air and operable to direct pressure air to said pressure operator to oppose any signal from the manual controller and thereby to cause the pilot valve assembly to cut off said fluid pressure source from the networks, and valve means operable by a pressure air signal from said load controller to cut off the pressure transmitter from the pressure operator and to direct said signal air to the latter to cause the pilot valve assembly to connect said opposite end of the networks to sump.

Figure 2:
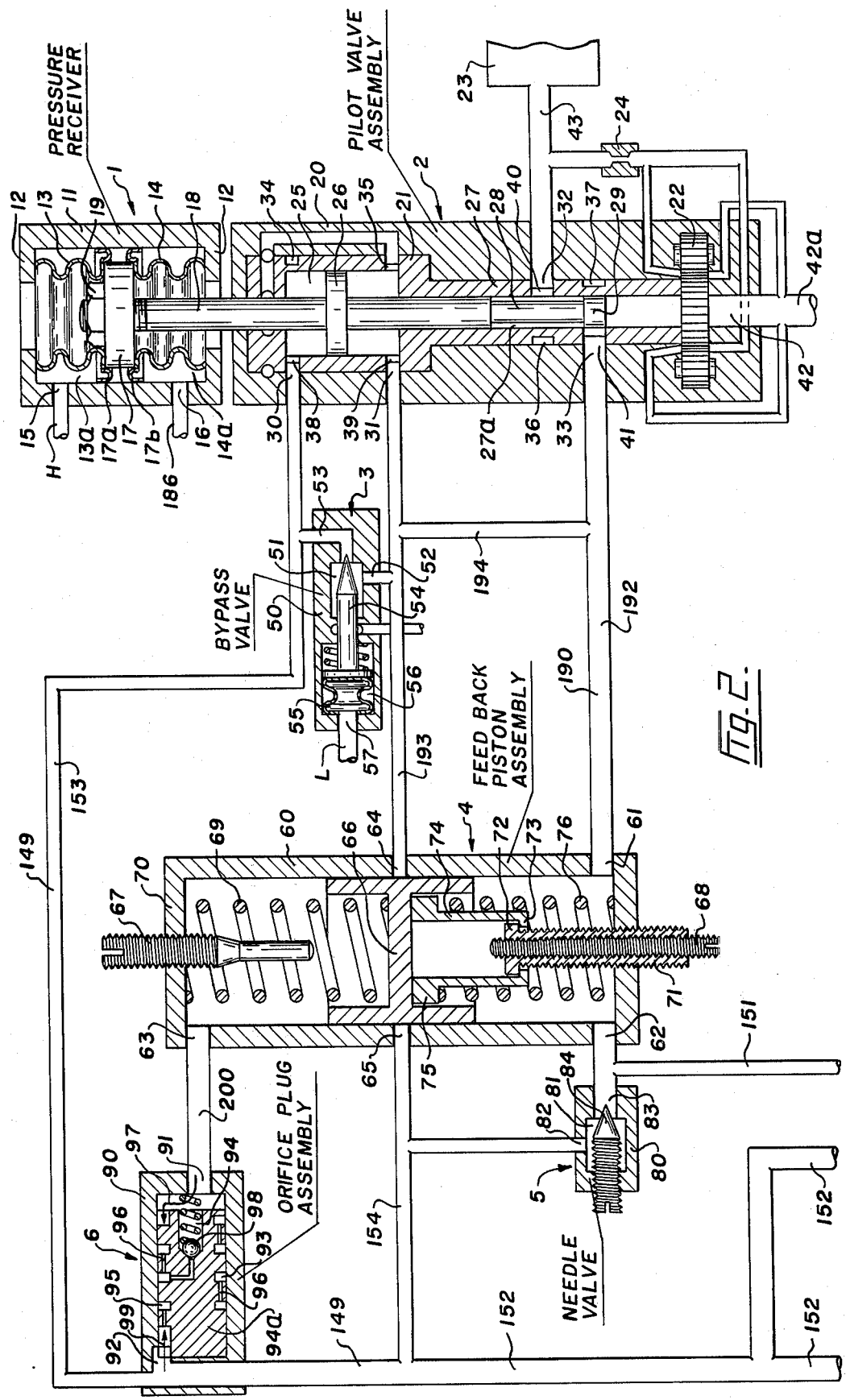

An example of this invention is illustrated in the accompanying drawings, in which FIG. 1 is a diagrammatic view of the overall control mechanism of this invention and a representive two-engine power system, FIG. 2 is a detailed diagram of half of the pitch control mechanism of this invention, FIG. 3 is a diagram of the remaining half of the pitch control mechanism, and FIG. 4 is an enlarged sectional view of part of an orifice plug assembly of the control system.

Referring to FIG. 1, A is a lever controlled pneumatic control head having ahead and astern air lines B and C. There may be two or more of these control heads connected up in parallel. Engines D have fuel injection pumps E, pneumatic fuel rack position transmitters F, and governors G with pneumatic speed setters. A control air line H extends from control head A, while air control lines J extend to a common shuttle valve K which directs air under higher pressure from one of the lines J to an air control line L. M is the pitch setting mechanism for propeller P. The propeller pitch control mechanism of this invention is indicated at R.

The pitch control mechanism R includes operator means in the form of an air pressure operator or receiver 1, the upper part of which is connected to the control hed A by line H. This pressure receiver receives signals through line H for increasing the pitch of the propeller, and also receives signals for stopping the pitch increasing action and for decreasing the pitch. Control means such as a pilot valve assembly 2 operates in response to signals in receiver 1 selectively to direct pressure fluid into the system, cut off the pressure fluid, and connect the system to a sump. A load control by-pass valve 3 is connected to valve assembly 2 and receives signals through line L to prevent pitch increasing. A feedback means or piston assembly 4 is connected to valve assembly 2, this device being designed to permit relatively rapid decreases in pitch and to act as a damper for pitch increases. Valve means in the form of a needle valve 5 is connected to assembly 4 for damping adjusting purposes. A fluid flow resistance assembly in the form of an orifice valve plug 6 is co-operatively connected to the feedback piston assembly 4.

Pitch operating means, such as a power piston and cylinder assembly 7 is connected to the propeller pitch setting mechanism M, and pressure fluid is selectively directed to either end of the piston assembly by a pitch selector valve assembly 8. The opposite ends of assembly 8 are connected by lines B and C to the pitch control head A. A pressure transmitter 9 is set in different positions by the operation of the power piston assembly 7, and it is connected through valve means such as a high pressure selector valve 10 to line L. Transmitter 9 is connected to a source of pressure air, while valve means 10 selectively permits air to travel to the lower part of pressure receiver 1, or to cut the latter off from the transmitter in response to signals received from the load sensors of the engine.

The arrangement shown consists of the combined pneumatic/hydraulic controller R for interposition between a variable pitch propeller and control signal sources derived from the remote control stations of a vessel and from the engine thereof. The controller is capable of operating a primary (inching control) and secondary (load control) modes and automatically shifts from the primary mode to the secondary mode when the engine load increases in such manner that the fuel consumption rises beyond the power absorption curve of the engine or beyond power condition.

The assembly shown comprises a number of separate units which are combined into one operating system. Initially, however, each unit will be described separately. The units interconnected in this system are: pressure receiver 1, pilot valve assembly 2, load control bypass valve 3, feedback piston assembly 4, needle valve 5, orifice valve plug assembly 6, power position assembly 7, pitch direction selector valve assembly 8, pressure transmitter 9 and shuttle valve 10.

Referring to FIG. 2, pressure receiver 1 consists of a cylindrical casing 11 having at opposite ends inwardly directed flanges 12 within which two metal bellows 13 and 14 are retained. These bellows combine with the casing and the end flanges to form two enclosed air chambers 13a and 14a. The chambers 13a and 14a have air inlets 15 and 16 respectively extending through the wall of the casing 11, and the inner ends of the bellows are connected to a piston 17, secured to the upper end of a valve spindle 18 by a nut 19. Piston 17 has upper and lower rolling diaphragms 17a and 17b connected thereto and which close off the adjacent ends of the chambers 13a and 14a formed by bellows 13 and 14 and casing 11. These chambers are in effect expansible so that air directed into chamber 13a or 14a moves piston 17 downwardly or upwardly, respectively.

The valve spindle 18 extends downwardly through an outer casing 20 of the pilot valve assembly 2 and into a bushing 21 thereof rotatable within the casing. The bushing 21 is rotatable by a hydraulic motor 22 at the lower end of the casing so as to prevent static friction arising between the spindle 18 and the bushing. The hydraulic motor is supplied with hydraulic fluid under pressure from a source 23 through an orifice plug 24.

The bushing 21 has a cylinder 25 formed therein in which a piston 26 secured on the spindle 18 is movable. At its lower end, the spindle 18 is movable in a reduced tubular extension 27 of the bushing and has a section 28 of reduced diameter in the bore 27a of the extension and defining a land 29 at the lower end thereof.

The casing 20 has four vertically arranged ports 30, 31, 32 and 33, respectively communicating with external annular grooves 34, 35, 36, and 37 in the bushing 21 and its tubular extension 27. The grooves 34 and 35 have inner radial ports 38 and 39 communicating with the upper and lower ends respectively of the cylinder 25. The groove 36 has an inner radial port 40 which opens into the bore 27a of extension 27 so as to always communicate with the space around the reduced diameter portion 28 of the spindle 18 regardless of its axial position. The groove 37 communicates through a port 41 with the bore 27a at a position such that the land 29 can sweep across this port during axial movement of the spindle 18. The lower end of the tubular extension 27 communicated through an outlet 42 and line 42a with an oil sump 42b, see FIG. 1. The inlet port 32 is connected through a fluid line 43 to the source 23 of hydraulic fluid under pressure.

The load control bypass valve 3 comprises a block 50 formed with a valve chamber 51 having an inlet 52 and an outlet 53. The needle valve 54 is movable by means of a pneumatic bellows 55 in a retainer chamber 56 to open or close the outlet 53. The bellows 55 has an air inlet 57 to which line L is connected.

The feedback piston assembly 4 consists of a cylindrical casing 60 having a first and second ports 61 and 62 at the lower end thereof and a port 63 at the upper end thereof. A pair of bypass ports 64 and 65 in circumferential alignment are provided at a mid position along the cylinder 60. Within the cylinder 60, an H-section piston 66 if movable. Axially adjustable limit screws 67 and 68 are provided for limiting the axial movement of the piston 66 so that the extent to which the ports 64 and 65 are uncovered during extreme movements of the piston 66 can be preset.

A preloaded coiled spring 69 is provided in the upper chamber defined by the cylinder 60 and piston 66 and extends between the piston and the upper wall 70 of the chamber. In the lower chamber defined by the cylinder 60 and the piston 66, a threaded bushing 71 surrounding the limit screws 68 has a flange 72 at its upper end beneath which a flange 73 of an upwardly extending spring retainer sleeve 74 engages. At the upper end of the sleeve 74, a flange 75 is provided, which within the limits of the movement of the sleeve 74, abuts the piston 66, the upward movement of the sleeve being stopped when its flange 73 engages flange 72 of bushing 71. A coiled spring 76 extends between the lower wall of the cylinder 60 and the flange 75. It will be seen that the spring 76 is in effect caged by this arrangement or, in other words, spring 76 exerts force against the piston only until the flanges 72 and 73 abut.

The needle valve 5 consists of a block 80 formed with a chamber 81 having an inlet 82 and an outlet 83 which is in communication with port 62 of assembly 4. A needle valve member 84 is threaded in block 80 for adjustment to vary the constriction at the outlet 83.

The orifice plug valve assembly 6 comprises a block 90 having end ports 91 and 92 which, within the block, communicate with parallel outer and inner passages 93 and 94 of a plug 94a within the block, see FIG. 4. Outer passage 93 is made up of a plurality of axially spaced circumferential grooves 95 which are interconnected by staggered axial constricting passages 96. The flow of fluid from port 91 in the direction of arrow 97 from end to end of block 90, is restricted as it travels through passages 96. Inner passage 94, which is relatively short, communicates at one end with one of the grooves 95 spaced from port 92 and at its opposite end with port 91. A spring loaded non-return valve 98 is located in inner passage 94 and opens towards port 91. When fluid flows from port 92 in the direction of arrow 99, it travels through some of the constricting passages 96 and grooves 95, and through inner passage 94 past valve 98. In other words, fluid from port 91 travels through restrictions from end to end of this valve arrangement whereas fluid from port 92 travels in the opposite direction through some restrictions and freely through passage 94.

The power piston assembly 7, see FIG. 3, consists of a block 100 having a cylinder 101 formed therein at one end, said cylinder being provided with end ports 102 and 103. A piston 104 is movable in the cylinder and has a piston rod 105 projecting from one end thereof through a gland 106. The end of the piston rod 105 is connected to the operating lever of the propeller pitch setting mechanism M.

A second piston rod 107 projects from the other end of the piston 104 and through a gland 108 into a cylindrical chamber 109. Within the chamber 109, the piston rod 107 is formed with a portion 110 of reduced diameter so as to form spaced steps 111 and 112. Flanged retainer bushes 113 and 114 are slidably mounted on the reduced portion 110 and normally abut the steps 111 and 112. These bushes are resiliently retained against the steps by a coil sring 115 extending between the bushes. In the centered position of the piston 104, the steps 111 and 112 are aligned with the end walls of the cylindrical chamber 109 so that bushes 113 and 114 abut these walls. With this arrangement, piston 104 is normally retained in its central or neutral position by spring 115. The piston rod 107 has an extension portion 116 projecting freely through an aperture 117 in the end of the cylindrical chamber 109 and carries a V cam 118 on the end thereof. The V cam 118 coacts with a cam follower 119 mounted on the end of an arm 120 pivoted at 121. The function of the cam 118 and follower 119 will be described subsequently.

The pitch direction selector mechanism 8 consists of a block 130 having an axial bore 131. At a central position, the bore 131 communicates through a fluid line 132 with oil sump 42b. To each side of the fluid line 132, a valve assembly is provided, the two valve assemblies being substantially identical. In the following description, only one of these assemblies will be described with the same reference numerals being assigned to the same parts in each assembly. Each assembly comprises ports 133, 134 and 135 entering the bore 131 in sequential spaced relation along the bore away from the fluid line 132. The end of the bore is formed with a cylinder 136 having an inlet 137 for control air under pressure. The inlet 137 at the right hand end of block 130 is connected to line B, while the inlet 137 at the opposite end of said block is connected to line C. Within the cylinder 136 a piston 138 is movable, being biased towards the air inlet by a coil spring 139. A spindle 140 extends from the piston along the bore and has three lands 141, 142 and 143 defining between them reduced diameter portions 144 and 145. A drain passage 145a extends through block 130 from cylinder 136 and is connected to the oil sump by a connection not shown. A passage 146 extends with and along the spindle between the reduced diameter portion 144 and a groove 147 formed in the land 143.

The arrangement is such that in the position shown, the land 143 prevents communication between the ports 134 and 133 while leaving port 133 in communication with line 132, but when the piston 138 is moved along the cylinder 136 by application of air pressure, the land 143 permits communication between ports 134 and 133 but closes the connection between the port 133 and the line 132. At all times, the ports 134 and 135 communicate with bore 131 respectively at the reduced diameter portions 144 and 145 of the spindle.

The right hand valve assembly in addition has a port 148 entering the bore 131 at the reduced diameter portion 144 of the spindle. The two ports 134 are connected to a common fluid line of a pitch increase system or network 149, and the two ports 133 are connected by lines 149a to the ports 102 and 103 of the cylinder 101. The ports 135 are connected as shown by lines 149b to the glands 106 and 108 surrounding the piston rods 105 and 107 and also by a passage 149c in block 100 to a gland 150 surrounding the piston 104. Port 148 is connected by a line 151 to port 62 of assembly 4.

The system 149 includes lines 152 extending from ports 134 of assembly 8 to port 92 of assembly 6, see FIG. 1, a line 153 extending from said port to port 30 of assembly 2, and a bypass line 154 between line 152 and ports 65 and 82 of assembly 4 and valve 5, respectively. Outlet 53 of valve 3 is connected to line 153 of system 149.

The pressure transmitter 9, see FIG. 3, consists of a block 160 formed with a chamber 161 having an inlet 162 and an outlet 163. The inlet 162 is closed by a valve member 164 having a downwardly extending needle portion 165. The valve member 164 is biased so as to tend to close the inlet by means of a coil spring 166 acting within a chamber 167 having an inlet 168 from a source of air under constant pressure.

The needle portion 165 is axially engaged by a plunger 169 incorporated a bellows 170 in which a bleed hole 171 is provided. The plunger extends downwardly through the casing 160 and abuts the lever 120 at its lower end 172. The bleed hole 171 communicates with atmosphere through a central bore 173 in the plunger and an outlet 174 therein. A flange 175 is provided on the plunger above the end 172, and a coil spring 176 is located between the flange and the casing 160 to tend to bias the plunger downwardly. The outlet 163 communicates with an inlet 180 of shuttle valve 10, said valve having a chamber 182 therein from which an outlet 183 extends. A second inlet 184 is provided for the chamber 182 and is connected to line L. With this arrangement, air under pressure can be selectively directed to outlet 183 either from inlet 184 or inlet 168 through inlet 180, the other inlet then being closed by a ball or valve member 185 in chamber 182. Outlet 183 is connected by a line 186 to port 16 of pressure receiver 1.

The various elements above described are connected as shown in the drawing. Thus the fluid line network 149 is connected to the following ports: port 30 of pilot valve assembly 2, port 53 of the load control bypass valve assembly 3, port 92 of the orifice plug assembly 6, bypass port 65 of the feedback piston assebly 4, port 82 of the needle valve assembly 5, and both ports 134 of the pitch direction selector valve assembly 8. The needle valves of assemblies 3 and 5 are connected in parallel. With both of these valves in their normal open position, the flow through assembly 5 is much less than through assembly 3, for example about 5% of that flowing through the latter assembly.

A pitch decrease system or network 190 includes a line 192 interconnecting ports 33 and 61 of assemblies 2 and 4, a line 193 interconnecting ports 31 and 64 of these assemblies and port 52 of valve 3, and a connecting line 194 extending between lines 192 and 193.

The network 190 interconnects the following ports: ports 31 and 33 of the pilot valve assembly 2, inlet port 52 of the bypass valve assembly 3, bypass port 64 and inlet port 61 of the feedback piston assembly 4, and, through the lower chamber and port 62 of the feedback piston assembly, outlet port 83 of the needle valve assembly 5, and through line 151 port 148 of the pitch direction selector valve assembly 8.

Generally speaking, when piston 17 moves valve 18 downwardly, port 41 is connected to port 32 and pressure oil from source 23 travels through the system to a selected end of cylinder 101 to increase the pitch of the propeller in the selected ahead or astern direction. On the other hand, when valve 18 is moved upwardly, port 41 is connected to drain port 42 to allow oil to flow from cylinder 101 under the action of spring 115 to the sump, thereby permitting a decrease in the propeller pitch.

The system shown in the drawings is capable of two modes of operation, namely, inching control which is utilized to control the speed or power and direction of vessel; and load control in accordance with the load on the engine, and which overrides the inching control when this load goes beyond a preset limit. Each will be described in turn.

INCHING CONTROL

Normally when the engine load is within the preset limits, air pressure is not present in the lines L and the inlets 57 and 184 of the load control bypass valve 3 and shuttle valve 10. Consequently, the bypass valve 3 is open, and the chamber 161 of the pressure transmitter 9 communicates with the outlet 183 of valve 10 which is connected to port 16 of pressure receiver 1.

When it is desired to go ahead or astern, the control lever of head A is moved in the appropriate direction to direct air through line B or C to one of the inlet ports 137 of the pitch direction selector valve assembly 8 so that the respective piston 138 is moved along its cylinder. In this example, for "go ahead", air is directed through line B so that the right hand position 138 is so moved. This movement causes the right hand spindle 140 to shift leftwardly and the land 143 to close the connection between the right hand port 133 and line 132, and simultaneously opening communication between the port 134 and said port 133. The left hand port 133 remains in communication with port 132 at this time.

At the same time, this action of the control lever causes a pitch increase signal to be applied through line H to inlet 15 of the pressure receiver 1. The pressure of the increase signal depends upon the extend of movement of the control lever. This pressurizes upper chamber 13a to depress the piston 17 and the spindle 18, causing the land 29 to uncover the port 41, at the same time sealing off the sump outlet 42. Fluid from constant pressure source 23 now passes via the network 190 and bypass valve assembly 3 into the network 149. From the network 149 the fluid passes through ports 134, 133 and 102 into the right hand side of the cylinder 101. The increase in pressure in this cylinder causes the piston 104 to move to the ledt to cause an increase of the pitch of the propeller in the ahead direction, the oil in the left hand end of the cylinder flow to drain at this time. The setting of needle valve 54 in assembly 3 determines the rate of movement of this piston. When the pitch increase signal is applied, the pressure oil tends to move piston 66 upwardly in assembly 60, forcing some oil through the restricted passage 93 of plug assembly 6 to help the movement of piston 104 in its cylinder. If the control lever is suddenly moved through most if its stroke, port 41 may be uncovered sufficiently to cause the pressure oil to shift piston 66 upwardly sufficiently to uncover bypass posts 64 and 66 so that the pitch of the propeller will be rapidly increased.

The described movement of piston 104 at the same time compresses spring 115 of piston assembly 7 and moves the V cam 118 axially thus lifting the cam follower 120 and the plunger 169. The valve member 164 is lifted and air enters the chamber 161, passing via the shuttle valve 10 to outlet 183 thereof and line 186 to port 16 of pressure receiver 1. The lower bellows chamber 14a of the pressure receiver is thus pressurized and counterbalances the pressure in the upper bellows 13a so that the spindle 18 rises and closes the port 41. The piston 104 will thus remain in its displaced condition to maintain the increase in pitch. With this arrangement, any settings from very small to large can be achieved with precise control.

When the pressure in chamber 14a balances that in chamber 13a the air pressure in chamber 161 increases so that bellows 170 collapses to allow valve 164 to close under the action of the incoming air and of spring 166 to close off the supply of air to chamber 14a.

When it is desired to decrease the propeller pitch, the control lever is moved back, thereby causing the pressure in chamber 13a of receiver 1 to be reduced relative to the pressure in chamber 14a. This results in spindle 18 rising to uncover port 41 to connect networks 149 and 190 to sump. The consequent movement of cam 118 by spring 115 allows plunger 169 to move downwardly away from needle 165 to relieve the pressure in chamber 14a, thereby stopping the pitch decreasing action by cutting off networks 149 and 190 from drain. Should the control pressure in line H be lost, the propeller pitch cannot be decreased by spring 115 beyond the zero pitch setting.

At all times, the bleed hole 171 in the pressure transmitter bellows 170 maintains sufficient pressure in the bellows to keep valve member 164 slightly open. This maintains a small air flow past the valve member 164 so that it is not necessary to crack open the valve before pressure is applied to the lower bellows chamber 14a. This maintains the sensitivity of the system.

It will be seen that with inching control, the pitch can be increases or decreased without any limit except that imposed by the mechanics of the propeller and its setting mechanism. Whilst the control is effected within the power absorption curve of the engine, this is not objectionable. However, when the loads applied to the engine become excessive, it is necessary to quickly impose on the inching control operation an overriding control which takes account of the operating conditions of the engine. This overloading can be caused by sudden reversal of the propeller pitch when the vessel is moving either ahead or astern, by hull resistance at high speeds in the water or increase of load on the vessel, such as occurs, for example when it is a towing vessel. Prior systems which impose load control in these situations are known but in arrangements where there is an operational overlap, so that both inching and load control occur simultaneously for a period. This effectively delays the imposition of load control, during which delay overload of the engine occurs. The present system provides an arrangement whereby there is a instantaneous transfer from inching to load control without any such overlap.

LOAD CONTROL

When the control lever of head A at the remote station is moved beyond a certain point or when the load conditions of the propeller are unduly increased, the load on the engine increases beyond the power absorption curve of the engine, and at this point a pneumatic signal, the strength of which depends upon the amount of overload, is transmitted through lines J and L by the overload detection system of the engine to the inlet 57 of the bypass valve 3 so that this valve is instantly closed, thus mutually isolating the fluid networks 149 and 190 from each other, except for the controlled leakage through the needle valve 5. This also cuts off network 149 from the power oil source to stop any movement of power piston 104 thereby. Thus any inching action is cut off. If there are two engines D in parallel, valve K causes the pneumatic signal from the first engine to be overloaded to be directed to valve 3 for instant isolation of the network 149.

When bypass valve 3 is closed, the major oil passage between port 41 of assembly 2 and power piston 104 is through plug assembly 6 in series with feed back piston assembly 4, excepting for a very small flow through needle valve 5.

When the overload condition occurs in the engine as discussed above, a pneumatic signal is also passed by line L to the inlet 184 of the shuttle valve 10 which drives the valve member 185 to the right to close the inlet 180 and causes an overriding air pressure from inlet 184 to pass through outlet 183 and line 186 and consequently to inlet 16 of pressure receiver 1 and to the lower bellows chamber 14a. When this pressure surpasses that in chamber 13a, piston 17 and spindle 18 move upwardly causing port 41 to communicate with sump outlet 42. This relieves the pressure in the network 190 thereby allowing the piston 66 in the feedback piston assembly 4 to move downwardly under the action of the fluid pressure of network 149 and spring 69 and against the pressure of spring 76. Pressure in the righthand side of the cylinder 101, caused by spring 115 moving the power piston in the decreases pitch direction, is relieved through the restrictive passage 93 in the orifice plug asembly 6 and a connection 200 between the ports 91 and 63. Downward movement of piston 66 permits the oil to flow into network 190 and thence to the sump. As the oil travels through some of the restrictive passage 93 in assembly 4, the pitch decrease is dampened.

The relatively higher pressure in the network 149, resulting from the pressure relief of the network 190, also causes the piston 26 in the cylinder 25 of assembly 2 to move downwardly so that the port 41 is closed to prevent an excessive pitch decrease occurring. Any residual pressure difference between the systems is then faded through the needle valve 5 which is set to provide an acceptable rate of fade. This allows piston 66 to return slowly to its normal position. This piston movement is assisted by spring 76, until flange 73 engages flange 72.

During extreme load changes when large pitch changes are required, and if the error persists, the feedback piston 66 will move far enough to uncover bypass ports 64 and 65 to permit rapid pitch decrease. The limit screws 67 and 68 are adjustable to control the extent to which these ports will open. When ports 64 and 65 are in communication, the pressure differential between networks 149 and 190 lessens so that the pressure applied to piston 20 is less thereby permitting power piston 104 to move faster than it otherwise would.

If the control lever of head A at the control station is moved again to increase the pitch, the resulting pressure in the bellows chamber 13a will increase as before to depress the spindle 18 and fluid will be introduced into the network 190 to urge the piston 66 upwardly from its normal position. As the piston is free of flange 75 of sleeve 74, it can move upwardly in spite of the fact that flanges 72 and 73 are abutting at this time. This upward movement of the piston is relatively slow due both to the resistance of the spring 69 and the effect of restricting passage 93 through which the fluid in the upper chamber of assembly 4 must pass to reach the cylinder 101.

With this arrangement, the feedback piston assembly 4 and orifice plug assembly 6 permit relatively rapid decreases in pitch but act as dampers on pitch increases. The restrictive passage 93 also prevents a rapid opening of the bypass ports 64 and 65 if the pressure in network 149 is for some reason excessively low. Excessively rapid pitch decreases are prevented since the part of passage 93 connected to passage 94 creates some time delay in the opening of ports 64 and 65.

The function of the various glands in the device fed through the channels 32 and ports 135 is to ensure that there is no leakage of oil from the network 149 to sump. The system is thus conditioned to ensure that the pressure in the network 149 is not during steady state conditions less than that in the network 190.

Simple stated, when it is desired to move ahead or astern, signal air is directed to either one of the ports 137 of the pitch selector assembly 8, the one depending on the desired direction of movement, and at the same time, signal air is directed to port 15 of pressure receiver 1 to cause pressure oil to be directed from source 23 through networks 149 and 190 to the appropriate port 133 of piston assembly 7 to move piston 104 in the desired direction. Cam 118 immediately opens valve 164 of transmitter 9 to direct air to port 16 of the pressure receiver to cut off the oil source from the two networks, thereby preventing overshooting of the desired setting. Thus the pitch setting is very sensitive and instant acting.

In the event of the engine being overloaded beyond a predetermined point, the overload detecting system of the engine sends an air signal to close valve 3 and thereby cut off the inching control system, to pressure transmitter 9 to operate valve assembly 2 to connect network 190 to sump through piston assembly 4. This allows power piston 104 to move so as to allow a pitch decrease. The resulting higher pressure in network 149 operates the valve assembly to cut off network 190 from the sump, thereby cutting off the decreasing action.

I claim:
1. A system for controlling the pitch of a variable pitch propeller of a vessel and driven by an engine having a manual controller for normal operating conditions and an automatic load controller for protecting the engine from predetermined overload conditions, comprising a first fluid network,
a second fluid network in parallel with the first network,
pitch operating means to increase and decrease the pitch if said propeller in ahead and astern directions, said operating means being connected to one end of both of said networks and being operable by pressure fluid therefrom,
a pitch selector operable by air signals from said manual controller to direct fluid from said networks to the pitch operating means selectively to effect pitch increase or decrease,
control means for connecting an opposite end of both of said networks selectively to a source of pressure fluid or a sump,
operator means for operating said control means in response to air signals from said manual controller to cause said control means to connect the pressure fluid source to the networks,
a bypass between the two networks and having a load control valve therein operably by air signals from said load controller to close the bypass,
fluid flow resistance means in the second network between said bypass and said pitch operating means,
pressure means connected to a source of pressure air and operable to direct pressure air to said operating means to oppose any signal from the manual controller and thereby to cause said control means to cut off said fluid pressure source from the networks, and
valve means operable by a pressure air signal from said load controller to cut off said pressure means from the operator means and to direct said signal air to said operator means to cause said control means to connect said opposite end of the networks to sump.

2. A system as claimed in claim 1 including feedback means in the second network between said bypass and said flow resistance means, said feedback means being operable when the second network is connected to sump to allow fluid to flow from said pitch operating means to sump.

3. A system as claimed in claim 2, including valve means bypassing said feedback means to permit limited flow of said fluid past the feedback means when the second network is connected to sump.

4. A system for controlling the pitch of a variable pitch propeller of a vessel and driven by an engine having a manual controller for normal operating conditions and an automatic load controller for protecting the engine from predetermined overload conditions, comprising a piston and cylinder power assembly to increase and decrease the pitch of said propeller in ahead and astern directions,
a first fluid network,
a second fluid network in parallel with the first network, an ahead and astern pitch selector valve assembly for connecting one end of both of said networks selectively to the power assembly to effect pitch increase or decrease in accordance with signals from said manual controller, a pilot valve asembly for connecting an opposite end of both of said networks selectively to a source of pressure fluid or a sump, an air pressure operator for operating said pilot valve assembly, said pressure operator responding to signals from said manual controller to cause the pilot valve assembly to connect said pressure fluid source to said networks, a bypass between the two networks and having a normally open air-controlled load control valve therein, said control valve being operable by signals from said load controller to close said bypass, a fluid flow resistance assembly in the second network between said bypass and the power assembly, a pressure transmitter connected to a source of pressure air and operable to direct pressure air to said pressure operator to oppose any signal from the manual controller and thereby to cause the pilot valve assembly to cut off said fluid pressure means from the networks, and valve means operable by a pressure air signal from said load controller to cut off the pressure transmitter from the pressure operator and to direct said signal air to the latter to cause the pilot valve assembly to connect said opposite end of the networks to sump.

5. A system as claimed in claim 4 including a feedback piston assembly in the second network between said bypass and said resistance assembly, said feedback assembly being operable when the second network is connected to sump to allow fluid to flow from said power assembly to sump.

6. A system as claimed in claim 5 including valve means bypassing said feedback assembly to permit a limited flow of fluid past said feedback assembly when the second network is connected to sump.

7. A system as claimed in claim 4 including piston means in the pilot valve assembly connected to the first network and operable by back pressure in said first network when said bypass is closed to cut off the networks from sump.

8. A system as claimed in claim 4 including resilient means normally retaining the piston of the power assembly in zero pitch position in the cylinder of said assembly, and said pitch selector assembly is connected to direct fluid from the networks selectively to either end of said cylinder in accordance with each signal from the manual controller and at the same time to connect the opposite end of said cylinder to sump, said spring being strong enough to force fluid through the second network to sump when said second network is connected thereto.

9. A system as claimed in claim 8 in which said resilient means comprises an axial rod connected to said piston, spaced apart bushes slidably mounted on the rod, a spring bearing at opposite ends against said bushes, and shoulders on the rod limiting movement of the bushes away from each other.

10. A system as claimed in claim 9 including stop means adjacent each bush, bushes engaging the respective stop means when the piston is in its zero pitch position.

11. A system as claimed in claim 4 including cam means connected to the piston of the power assembly to operate the pressure transmitter to direct pressure air to the pressure operator when the piston has been moved to a pitch increase position by fluid from the fluid source to cut off said source.

12. A system as claimed in claim 4 in which said pilot valve assembly comprises a spindle operatively connected for axial movement to said air pressure operator, and valve means on the spindle positioned to connect the networks to the fluid pressure source upon movement of the spindle in one direction and to sump upon movement of said spindle in the opposite direction.

13. A system as claimed in claim 12 in which said spindle is slidably mounted in a rotatably mounted bushing, and including means for rotating said bushing to prevent static friction between the spindle and the bushing.

14. A system as claim in claim 4 in which said pressure operator comprises a piston operatively connected to the pilot valve assembly, first bellows means connected to one side of said piston, and second bellows means connected to the opposite side of said piston, said first bellows means being connected to receive air signals from said manual controller, said second bellows means being connected to receive air signals from said pressure transmitter and said valve means, and when the pressure in the first and second bellows means balances, the pilot valve assembly cuts off said networks from both the fluid pressure source and the sump.

15. A system as claimed in claim 4 in which said fluid flow resistance assembly comprises an orifice plug having a restricted passage extending therethrough and connected at one end to the second network and at an opposite end to the power assembly and the first network.

16. A system as claimed in claim 15 including second passage in said orifice plug parallel with said restricted passage and connected at one end to the second network and at an opposite end to said restricted passage at a point spaced from said opposite end of the restrictive passage, and a check valve in said second passage openable towards the second network.

17. A system as claimed in claim 5 in which said feedback piston assembly comprises a cylinder, a piston slidably mounted in the cylinder, first spring means on one side of the piston, second spring means on the opposite side of the piston, said first and second spring means oppose each other and normally retaining the piston in a central position, one end of said cylinder being connected to said fluid resistance assembly and the opposite end of said cylinder being connected to the second network.

18. A system as claimed in claim 17 in which said second spring means is caged so as not to assist movement of the piston beyond the central position thereof in the direction of the first spring means while resisting movement of the piston in the opposite direction out of said central position.

19. A system as claimed in claim 17 including first and second diametrically opposed ports in said cylinder normally closing by said piston, said first port being connected to the second network and to the first network between said bypass and the pilot valve assembly, and said second port being connected to the ends of said network that are connected to the power assembly.

20. A system as claimed in claim 17 including piston means in the pilot valve assembly operable to operate said valve assembly, and means connecting the first network on the side of said bypass remote from said opposite end of both of the networks to one side of said piston means to cause said piston means to operate the valve assembly to cut off said opposite end from sump by back pressure in said first network.

21. A system as claimed in claim 17 including first and second diametrically opposed ports in said cylinder normally closed by said piston, said first port being connected to the second network and to the first network between said bypass and the pilot valve assembly, and said second port being connected to the ends of said network that are connected to the power assembly, piston means in the pilot valve assembly operable to operate said valve assembly, means connecting the first network on the side of said bypass remote from said opposite end of both of the networks to one side of said piston means to cause said piston means to operate the valve assembly to cut off said opposite end from sump by back pressure in said first network, and means connecting said first port to an opposite side of said piston means, whereby the pressure on the two sides of said piston means balances when the bypass is open.

22. A system as claimed in claim 17 including a bypass between said one end of the networks and said opposite end of the feedback assembly cylinder, and a valve in the latter bypass adjustable to permit limited fluid flow therethrough, said latter bypass being in parallel with said first-mentioned bypass between the two networks.

23. A system as claimed in claim 4 in which said pressure transmitter comprises a cylinder having an inlet connected to said source of pressure air and an outlet connected to said pressure operator, a valve in said chamber between the inlet and the outlet and openable towards the inlet, and means operable by the piston of said power assembly on movement of the piston to increase pitch to open said valve, and means to permit said valve to close immediately after said piston movement.

24. A system as claimed in claim 23 in which said means operable to open the valve by movement of the power piston comprises a plunger positioned to be moved to open the valve, and cam means connected to the power piston and positioned to move the plunger to open the valve upon movement of the piston in either direction.

25. A system as claimed in claim 24 in which said means to permit the valve to close comprises a bellows incorporated in said plunger and communicating with the atmosphere outside transmitter chamber, said bellows collapsing under pressure in said chamber to in effect shorten the plunger to allow the valve to close.

26. A system as claimed in claim 25 in which said bellows is formed with a bleed hole therein.

27. A system as claimed in claim 23 in which said valve means comprises a shuttle valve, a first inlet in the shuttle valve connected to the outlet of the transmitter chamber, an outlet connected to said pressure operator, a second inlet connected to said load controller, and a movable valve member in the shuttle valve, said valve member closing off the second inlet when air flows from the transmitter chamber through the first inlet and no signal air flows from the load controller, and when signal air does flow from the load controller said valve member shifting to open the second inlet and close said first inlet.

* * * * *